July 14, 1964

H. F. GLASSNER ETAL
METHOD AND APPARATUS FOR AUTOMATICALLY
DETECTING DISORDERS OF THE HUMAN BODY 3,140,710

INVENTORS
HARVEY F. GLASSNER
RONALD E. SMITH
JACK H. WATSON
By Fulwider Mattingly & Huntley
ATTORNEYS

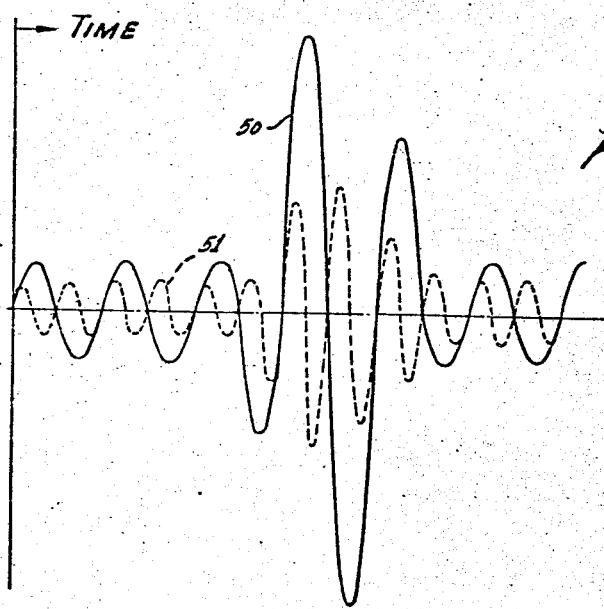
Fig. 2
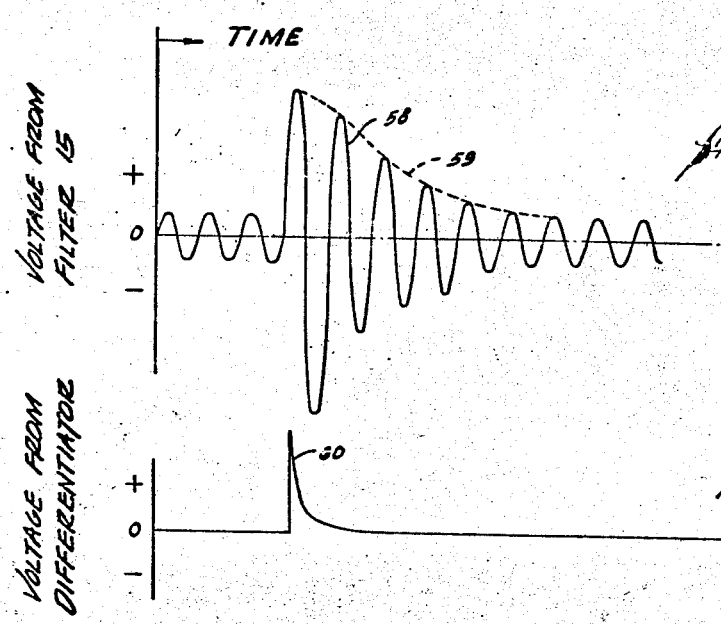
Fig. 3a
Fig. 3b
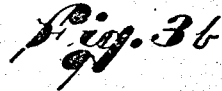
INVENTORS
HARVEY F. GLASSNER
RONALD E. SMITH
JACK H. WATSON
ATTORNEYS INVENTORS
HARVEY F. GLASSNER
RONALD E. SMITH
JACK H. WATSON
BY Fulwider Mattingly & Huntley
ATTORNEYS.

INVENTORS
HARVEY F. GLASSNER
RONALD E. SMITH
JACK H. WATSON

ATTORNEYS 3,140,710
METHOD AND APPARATUS FOR AUTOMATICALLY ANALYZING DISORDERS OF THE HUMAN BODY
Harvey F. Glassner, Culver City, Ronald E. Smith, Torrance, and Jack H. Watson, Los Angeles, Calif., assignors to Douglas Aircraft Company, Inc., Santa Monica, Calif.
Filed Feb. 29, 1960, Ser. No. 11,878
16 Claims. (Cl. 128—2.05)

This invention relates to clinical apparatus, and more particularly to a unique method and apparatus for analyzing and instantaneously classifying and diagnosing disorders of the body, such as cardiac disorders and the like.

Various types of techniques and instruments have heretofore been developed to aid the physician in making an analysis of heart disorders. For example, the electrocardiograph provides a continuous recording (i.e., electrocardiogram) of the fluctuations of the electric potentials generated during cardiac cycles. The recording is made on a roll of paper that is pre-ruled so as to indicate time intervals, the paper being moved at a constant speed relative to a writing pen.

Different portions of the electrocardiogram are given specific nomenclature, and such portions are determined to be of particular magnitudes and shapes for a normal heart. Standards for the range of normal values of auricular and ventricular deflections are provided in the form of tables of measurements made on great numbers of persons in different are groups.

The electrocardiograph provides clues to certain types of heart disorders. Such clues are obtained by inspection of an electrocardiogram, with reference to the magnitudes of the voltages at different points, the rapidity or frequency of fluctuations, and the shapes of the different portions of the voltage wave form, all relative to the common time base. Considerable difficulty is encountered, however, in determining the nature of a particular disorder because of the requirements of making accurate measurements of the various portions of the voltage fluctuations for making the desired comparison. For each portion, standards have been established for determining whether the voltage is high or low, or when it is of too great or too short duration. The physician must make very accurate measurements on the electrocardiogram of the various factors in a heart cycle, in order to properly interpret their meaning. The mechanics of making measurements are quite time-consuming, and it may be said that occasionally the results obtained depend upon how accurate the doctor is in computing distances, rather than upon his medical training.

Other information that forms a complement for that derived from electrocardiograms is in the realm of heart sounds. Heart sounds are, of course, valuable sources of clues for the detection of heart disorders. Here again, elaborate criteria have been established by the medical profession from which to make analyses of different heart conditions. Heart sounds may vary in intensity. In this area, the time of occurrence of murmurs in the cardiac cycle is important, whether the murmur occurs in the systolic phase or the diastolic phase of the cycle. Heart sounds are known to extend over a range of from 0.5 to 2,000 cycles per second. Obviously for many types of heart disorders, valuable information can be obtained throughout this frequency range. On the other ha the characteristics of the human ear are such that card sounds below 40 cycles per second cannot be detect And since there is so little energy in heat sounds in upper frequency range, such sounds above 750 cycles second are below the threshold of the human ear. cordingly, the stethoscope permits detection of he sounds with frequencies only in a very limited range the total frequency range for such sounds.

In view of the various limitations of the stethosco resort has been made to recording heart sounds of m netic tapes, and recording the electrical shapes of sounds on suitable instruments such as oscillographs. here again, the physician must wrestle with graphic pr entations requiring accurate measurements and estimat and his final insterprtation and anaylsis of the situati are largely affected by his ability to compute distances tween different portions of graphs, and to relate graphic portrayals of wave shapes, frequencies and a plitudes to each other and to an electrocardiogram ti base.

Another disadvantage of the prior art techniques a apparatus for making analyses of heart disorders res in the inability of different individuals to make the sa measurements and interpretations. So far as the stetl scope is concerned, the significance attached to the ord intensity, pitch, quality, duration and time of occurer of heart sounds must be based to a considerable ext upon the ability of the individual physician to h sounds. Some physicians may be able to hear sour over a considerably wider range than others, and a result will give an entirely different interpretation of significance of the sounds heard by them.

Another disadavantage of the human ear and the br is the inability to clearly separate and distinguish betwe closely spaced sounds. This is encountered, for examp when tachycardia (excessive rate) is superimposed cardiac disorders or during the stress of concurrent nesses. The physician is often unable to provide "audio" time expansion necessary in the clear delineati of the closely spaced signals.

Still another disadvantage of the prior art techniq and systems for analyzing electrocardiograms and he sounds is that, despite the various approaches that h been made, none of these has been able to measura shorten the undesired amount of time required for physician to make a diagnosis. After all is said and do with the electrocardiogram and the various graphic p trayals of heart sounds in front of him, the physic must delve into the time-consuming task of making nu erous measurements and observations before he can m a prognosis. This means that the physician is restric in the amount of time he can devote to new patients w are badly in need of his services.

In is an object of this invention to provide a meth and apparatus of analyzing heart disorders in a man that overcomes the above and other disadvantages prior art techniques and apparatus.

It is another object of this invention to provide method and means for providing instantaneous analy of heart sounds and making reliable identification, i classification, of heart disorders instantly available.

It is a further object of this invention to provide sou analyzing apparatus and methods capable of produci on a beat-by-beat, automatic diagnostic conclusions on the presence and absence of specific heart disorders.

Yet another object of this invention is to provide a unique means and method for electrically analyzing various electrical characteristics of a sound within the human body, and automatically presenting an observable indication of the presence or absence of a particular disorder in the body, and the clasification of a disorder that exists.

The above and other objects and advantages of this invention will become apparent from the following description taken in conjunction with the accompanying drawings of illustrative embodiments thereof, in which:

FIGURE 1 is a block diagram of one form of automatic phonocardiac analyzer in accordance with our invention, showing the arrangement of a plurality of signal channels coupled to a microphone input, such signal channels being adapted to supply voltages to respective indicators in the presence of sounds representing predetermined heart disorders, and showing means for establishing a time reference for the various channels so as to relate the disorders to predetermined portions of the cardiac cycle;

FIGURE 2 is a plot of the signal voltages from the filters in the channel of FIGURE 1 that is adapted to provide indications in the presence of normal heart sounds;

FIGURE 3a is a plot of the signal voltage from the filter in the channel of FIGURE 1 that is adapted to provide indications of the existence of a systolic murmur;

FIGURE 3b is a plot of the voltage obtained from the differentiator to which the rectified voltage of FIGURE 3a is applied;

Figure 1:
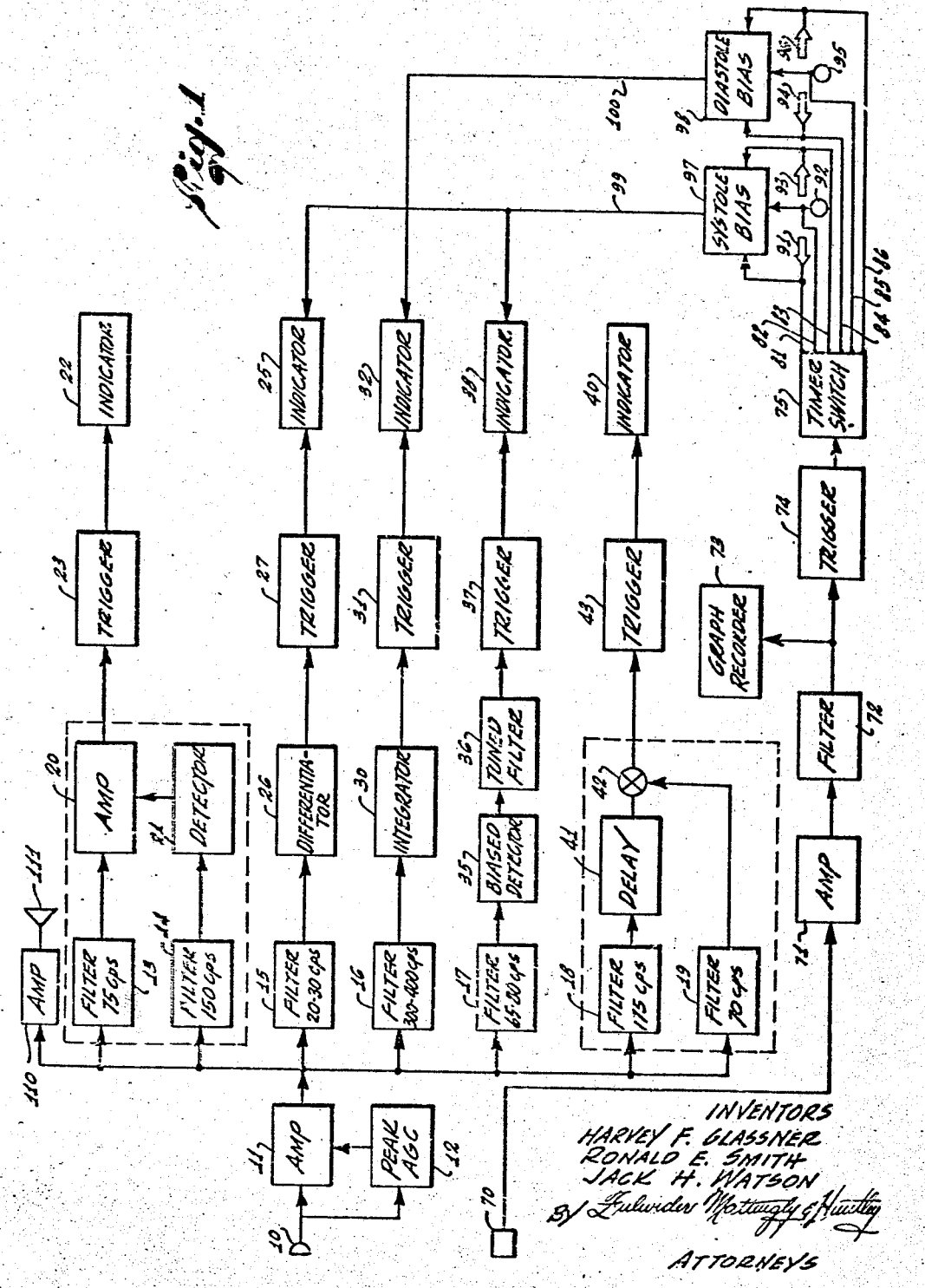

Our invention will be better understood in the light of the action of the heart and our discoveries relative thereto. As is well known, various factors contribute to heart sounds. Among these is muscle movement, i.e., the physical movements of the heart muscle during contraction and relaxation of the auricles and ventricles. The movement of blood through the auricles and ventricles also contributes to the characteristic sounds of hearts. Another contributor is the action of the valves of the heart, as the opening of the mitral and tricuspid valves on opening to admit blood from the left and right auricles into the left and right ventricles, and the closing of these valves during the ventricular phase of the cardiac cycle. Similarly, the physical opening of the aortic and pulmonary valves, to force fresh blood from the ventricles into the lungs and the body, and the closing of such valves during flow of blood from the auricles into the ventricles, constitutes a source of noise.

During the cardiac cycle, the blood coming from the extremities enters from the superior vena cava and from the inferior vena cava into the right auricle, thence to the right ventricle and to the pulmonary artery. From the pulmonary artery, the blood passes to the lungs, returning by the pulmonary vein into the left auricle, from which it passes into the left ventricle and out into the aorta. As will be apparent, any disease, constriction or dilation of any of these elements is a disorder that has an effect on the heart sound. We have discovered that various heart disorders can be identified correctly from the characteristics (e.g., amplitude, frequency, wave shape etc.) of heart sounds and their location in the cardiac cycle. For each of a number of sounds, we establish an energy spectrum, and determine therefrom wherein the major energy of the sound is found. The amplitudes of the various frequency components of the sound are analyzed to determine the relative magnitudes of the energy in a given band that are present in different sounds. The detected wave form, or envelope, is analyzed in each frequency band to determine wherein that component of the sound is distinguishable over components of other sounds in that same band, and how it can be utilized to signify the existence of the associated sound.

After establishing the energy spectrum for various heart sounds, we adapt electrical circuits for operation in response to the most significant characteristics of certain frequency components. The design and operation of such circuits also take into account such factors as the duration of the particular sound, the number of frequency portions of the spectrum throughout which the signficant energy is distributed, the order of appearance of different sound portions, and the characteristics obtained by various operations performed on different frequency portions, e.g., integration differentiation, wave shape detection, frequency relationship. In this manner, each grouping of electronic circuits is arranged to develop signal indications only in the presence of a sound of a predetermined character which is identifiable with a specific heart disorder. Suitable indicating means coupled to each of the groupings of electrical circuits provides a visual indication of the existence of a disorder.

To aid in understanding the above-described method of our invention, reference will be made to FIGURE 1, which illustrates the system of our invention for developing indications of the existence of one of five heart conditions—normal, systolic murmur, diastolic murmur, systolic gallop, and pericardial rub. These are heart sounds that can be differentiated stethoscopically by the physician, whereby to illustrate the operation of our invention to automatically analyze and indicate the more familiar heart disorders, and to demonstrate the operation of our method and system for automatically and instantaneously analyzing a variety of disorders.

Referring to FIGURE 1, there is shown microphone pickup device 10 to be located on the chest of a patient. The microphone 10 is coupled to an amplifier 11 that is provided with a peak automatic gain control (AGC) network 12 that effectively operates to prevent the amplifier output from exceeding a predetermined level despite the magnitudes or intensities of sounds picked up by the microphone 10. In this connection, the peak AGC network 12 may be a volume compressor control means, so that sounds above a predetermined decibel level result in a gain of the amplifier 11 being reduced, i.e., a gain of the amplifier 11 is reduced to a greater extent for voltages representing sounds of greater intensity. Thus, the system of our invention automatically compensates for wide variations in the intensities of sounds developed in the heart actions of different individuals.

Coupled to the amplifier 11 are filter networks 13, 14, 15, 16, 17, 18 and 19. Of these, the filters 13 and 14 are utilized in one channel in conjunction with an amplifier 20. To this end, a detector 21 is coupled between the filter 14 and the amplifier 20. The gain of the amplifier 20 is controlled by the output of the detector so that in the presence of a signal from the filter, the gain of the amplifier 20 is reduced.

An indicator 22 is coupled to the amplifier 20 through a trigger circuit 23, and is arranged to provide an observable indication, e.g., illumination of a lamp, in a situation wherein a signal is present in the output of the filter 13, and wherein there is no signal in the output of the filter 14. In this situation, the gain of the amplifier is high, and the signal from the filter 13 is amplified to operate the trigger 23 and establish an indication. If a signal is passed by the filter 14, and the ratio of the voltages from the filters 13 and 14 is outside a tolerable range, the gain of the amplifier is reduced so that its output cannot operate the trigger 23 and indicator 22.

The filter 15 is in a channel wherein a signal in the pass band of the filter is processed to establish operation of indicator means 25. For this purpose, a differentiator network 26 is connected to the filter 15, and a suitable trigger 27 is connected between the differentiator 26 and the indicator 25.

Whereas the channel that includes the filter 15 is adapted to differentiate certain frequency components, the channel that includes the filter 16 is adapted, through an integrator 30, to integrate certain frequency components. A trigger network 31 is coupled between the integrator 30 and an indicator 32.

Other frequency components of the input signal are passed through the filter 17 to be processed on the basis of its wave shape. Such wave shape detection is effected by a detector network 35 and a tuned filter 36. When a portion of the envelope of the detected signal fluctuates at the frequency to which the filter 36 is tuned, a signal appears in the output of the filter 36 sufficient to establish operation of a trigger circuit 37 and an indicator 38.

The filters 18 and 19 are located in a channel in which an indicator 40 is to be operated in the event that certain frequency components of the input signal occur in a predetermined sequence. The earlier frequency component is passed by the filter 18, and is delayed by a delay network 41 until the subsequently arriving different frequency component is passed through the filter 19.

When signals appear simultaneously in the outputs of the filter 19 and the delay network 41, they are summed, as indicated at 42, to obtain a voltage for operating a trigger 43 that controls the indicator 40.

For analyzing the cardiac disorders previously mentioned with the above-described system, various characteristics of the sounds associated with such disorders were analyzed, and we found that one or more of the characteristics of frequency, amplitude, wave shape, and timing were identifiable with a specific sound, and hence with the associated disorder. Also, one or more of these characteristics are capable of being processed in a manner to avoid any possibility of confusion over the disorder identification represented thereby.

Considering the five sounds associated with the normal heart sound, the systolic and diastolic murmurs, the gallop and the pericardial rub, we discovered the following characteristics peculiar to them:

A significantly large part of the energy of the normal sound occurs at 75 c.p.s. (cycles per second);

The presystolic gallop has the major portion of its energy in the 65–80-c.p.s. band. Yet the gallop sound has a wave shape distinctly different from the normal sound. Also, there is a strong 150-c.p.s. component in the gallop sound, and there is no such component in the normal sound. Furthermore, none of the other sounds have any relatively significant energy at these different frequencies.

FIGURE 2 illustrates voltage waveforms 50, 51 corresponding to the 75-c.p.s. and 150-c.p.s. components mentioned. As seen in FIGURE 1, the filter 13 is designed to pass the 75-c.p.s. voltage 50, and the filter 14 is adapted to pass the 150-c.p.s. voltage 51. Since the voltage 51 is associated with a cardiac disorder, its utilization to reduce the gain of the amplifier 20 prevents an indication for identifying a normal sound from being erroneously created in the presence of a sound associated with a systolic gallop.

Figure 5:
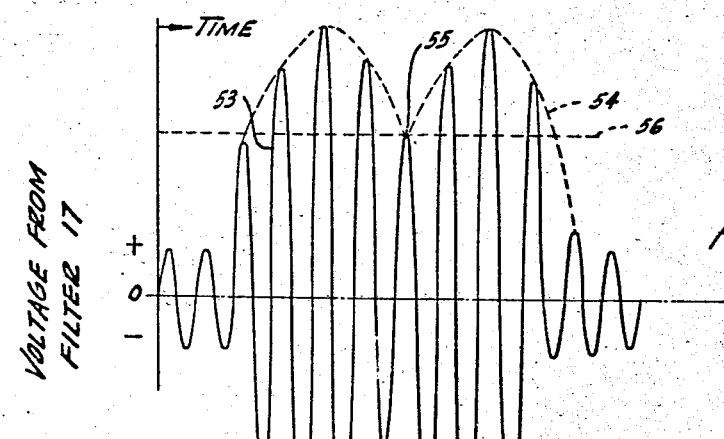
FIGURE 5 is a plot of the signal voltage from the filter in the channel of FIGURE 1 that provides an indication in the presence of the heart condition known as a gallop.

Regarding the systolic gallop, FIGURE 5 illustrates the voltage 53 that is passed through the filter 17 in the presence of the associated sound. Normal detection of the voltage 53 results in a voltage having the envelope 54.

The envelope 54 will be seen to be double humped, and to be symmetrical relative to the low point 55 between the humps. In the system of FIGURE 1, the detector 35 is biased so that only the portions of the voltage 54 above the point 55 appear in its output, indicated at a level 56. In this manner, an essentially sinusoidal voltage is developed, and the tuned filter 36 is tuned to the frequency of such sinusoidal voltage. Accordingly, only a signal of predetermined wave shape and frequency, peculiarly identifiable with the presystolic gallop, results in a voltage being applied to the trigger 37. Therefore, the indicator 38 operates only in the presence of this particular disorder.

FIGURE 3a illustrates the voltage 58 of a sound frequency in the range of 20–30-c.p.s. The envelope 59 of the voltage 58 will be seen to rise sharply and then fall gradually. Differentiation of the detected waveform 59 results in a sharp pulse 60 (see FIGURE 3b) that is used to operate the trigger 27. This variation in the 20–30-c.p.s. waveform is peculiar to the systolic murmur, and the major portion of the energy of the associated sound is in this frequency range.

Figure 4A:
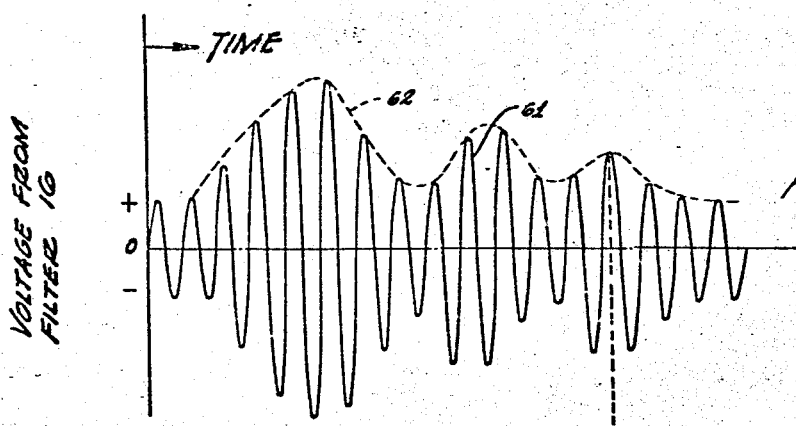
FIGURE 4a is a plot of the signal voltage from the filter in the channel of FIGURE 1 that provides indications of the existence of a diastolic murmur, indicating the shape of the detected waveform.
Figure 4B:
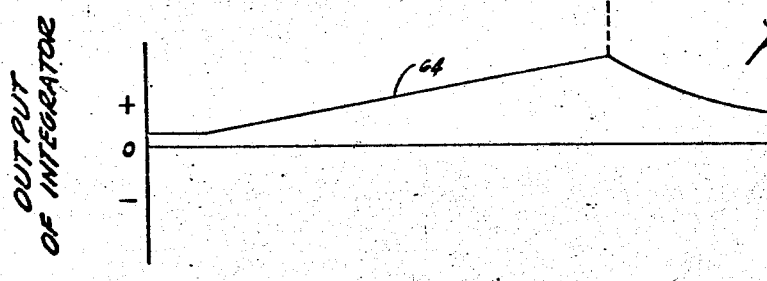
FIGURE 4b is a plot of the output of the integrator to which the rectified voltage of FIGURE 4a is applied.

The major energy of the sound of a diastolic murmur was found to be in the 300–400-c.p.s. range. FIGURE 4a illustrates the voltage 61 of a signal in this range. As seen by its envelope 62, this voltage slowly fluctuates in a decreasing manner. We utilize this characteristic to obtain an integrated voltage 64 (see FIGURE 4b) with which to operate the trigger 31 and the indicator 32.

Figure 6A:
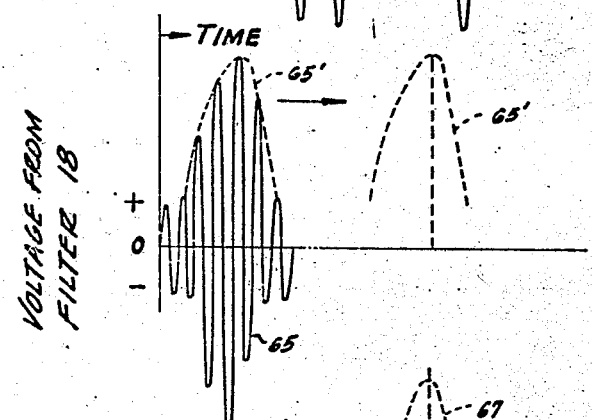
FIGURES 6a and 6b are plots of the voltages from the filters in the channel of FIGURE 1 that are to provide indications in the presence of sounds associated with a pericardial rub.
Figure 6B:
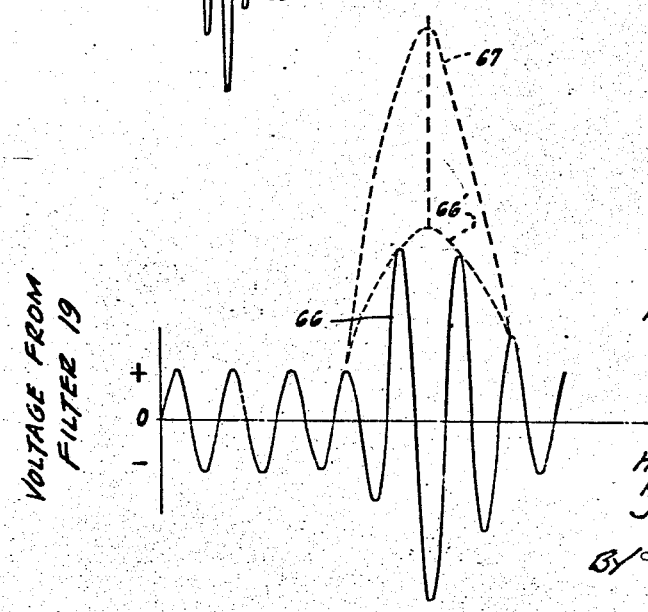

In the comparison of the five sounds as mentioned, we found that only the pericardial rub produced a sound having a strong 175-c.p.s. component. Additionally, the pericardial rub is characterized as a sound having different frequency components occurring in succession, and in which a strong 70-c.p.s. component follows the 175-c.p.s. component. FIGURES 6a and 6b illustrate the high frequency voltage 65 and the low frequency voltage 66 occurring in sequence. As illustrated, we prepare for addition by delaying the voltage 65 (by the delay network 41) until the peaks of their envelopes 65', 66' are in alignment. The subsequent addition of these voltages provides a much higher voltage 67 for application to the trigger 43.

In order to properly analyze a sound and identify a cardiac disorder therefrom, the sound must be properly placed in the cardiac cycle. In the foregoing description, it was assumed, for purposes of explanation, that the specified murmurs occurred during the contraction (systole) and relaxation (diastole) portions of the ventricular phase of the heart cycle.

Our invention also embraces automatic means for determining wherein the sounds occur in the cycle, and which utilizes this information to provide the identifying indications. One example of a source of voltages that follow the heart cycle is an electrocardiograph, wherein electrode pickup means 70 provides electrical signals that follow the body's electrical signal variations created during the cardiac cycle. The pickup 70 is coupled through an amplifier 71 and a filter 72 to a graph recorder 73 for providing the conventional electrocardiogram.

The output of the filter 72 is also fed to a trigger 74 for operating a timer 75. The timer 75 is one that develops voltages at different intervals, the occurrence of such voltages depending upon the characteristics of the signal from the trigger, and hence the particular electrocardiographic voltage. In one example, the timer develops voltages during the early, middle and late systolic, and the early, middle, and late diastolic portions of the cycle, as at respective output leads 81, 82, 83, 84, 85, 86.

The leads 81–86 are connected to respective indicators 91–96, such as lamps, to become illuminated during the various portions of the heart cycle. Also, these leads 81–86 are coupled to respective systole bias and diastole bias networks 97, 98. The bias networks 97, 98 may comprise a pair of amplifiers to develop signals in respective output connections 99, 100 in response to signals in any of the leads 81–83 and 84–86. For example, the groups of leads 81–83 and 84–86 may be connected to the grids of respective vacuum-tube amplifiers, the output connections 99, 100 being in the plate circuits. The systole bias output connection 99 is coupled to those indicators 25, 38 that are in channels in which systolic disorders are to be identified, e.g., the systolic murmur and systolic gallop. Similarly, the diastole output connection 100 is coupled to the indicator 32 that is to signify the presence of a diastolic murmur.

The indicators 25, 32 and 38 are the types that will be rendered operative in response to two input signal conditions—in this case, signals from the triggers 27, 31 and 37 and from the systole and diastole bias networks 97, 98. As will be apparent, an indicator associated with a normal sound need not depend upon the existence of a systole or diastole marker for its operation. Such indicator 22 is of the type that operates in response to one input signal (from the trigger 23).

Figure 7:
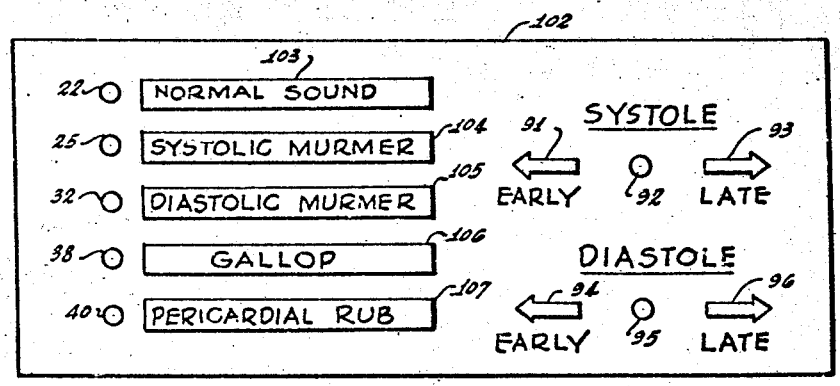
FIGURE 7 is a front view of an indicator panel for presenting visual indications of various heart disorders during operation of the system of FIGURE 1.

FIGURE 7 shows one example of a visual display to identify the above heart disorder to the observer. A panel 102 contains labels 103, 104, 105, 106, 107 showing the names of the disorders, and the indicators 22, 25, 32, 38 and 40 are located adjacent the proper labels. These indicators operate in conjunction with the systole indicators 91, 92, 93 and the diastole indicators to positively identify the disorder analyzed by the electrical apparatus. For example, the "systolic murmur" indicator 25, and the diastole "late" indicator are illuminated in the presence of a sound associated with a presystolic murmur. To aid the physician, an amplifier 110 and loudspeaker 111 combination (see FIGURE 1) may be coupled to the amplifier 11 for providing audible reproduction of heart sounds.

As will be apparent from the foregoing, our invention embraces a variety of means for processing sound signals from experimentally determined data, and for automatically analyzing different sounds and identifying body disorders therefrom. For example, although five signal channels are described for use in determining five heart disorders, it is apparent that our invention is not limited to any particular number of channels.

Nor is our invention limited to the particular arrangements for processing signals. As will be apparent, any desired processing means may be employed, so long as it effects the necessary indication in the presence of a sound associated with a disorder that such means is to identify.

It should be noted that our unique method and apparatus are adapted to analyze a single heart beat and provide an indication of the disorder. This result permits the physician to closely follow any pattern or disorder as the heart rate varies over a wide range, an impossible achievement for prior art methods and apparatus.

In view of the foregoing, it will be apparent that various modifications can be made in the apparatus shown and described without departing from the spirit and scope of our invention. For example, if heat sounds are explored at different areas, the microphone is located at different positions. From such different points, heart sounds are made up of different frequency components. In such case, a microphone position feedback may be employed, wherein all of the filters are adjusted simultaneously as necessary upon changing the position of the microphone.

Other time bases may be employed instead of the electrocardiograph type, e.g., pressure waves. Graph recording of heart disorders may be employed, as by utilizing the operation of an indicator to operate a writing unit in conjunction with that of the electrocardiogram. Also, severity of heart disorders may be indicated, as by circuit means operating "severe" and "mild" indicators. Accordingly, we do not intend that our invention shall be limited except as defined by the appended claims.

We claim:

1. The method of analyzing and classifying body sound to automatically diagnose a cardiac condition which comprises: applying a transducer to a patient's body to develop an electrical signal corresponding to the body sound; filtering said signal to pass a modified signal of a predetermined frequency determined by the value of said filter, which modified signal and frequency are characteristic but not conclusive of the existence of a certain cardiac condition; operating on said modified signal to produce a resultant signal which uniquely represents said certain body condition; applying said resultant signal to means indicating by the presence of said resultant signal the diagnostic presence of said certain cardiac condition; applying electrical pickup means to the body and developing therefrom voltages indicative of the separate portions of the ventricular phase of the heart cycle; and applying a signal to said indicating means of a developed voltage indicative of a particular portion of the heart cycle so that the indicating means will give a diagnostic indication only when said resultant signal occurs in the proper portion of the heart cycle.

2. The method of automatically diagnosing a heart condition which comprises: applying a transducer to a patient's body to develop an electrical signal corresponding to heart sound; passing said electrical signal through first and second parallel filter circuits, the first of which passes frequencies of substantially 75 cycles per second and the second of which passes frequencies of substantially 150 cycles per second; and combining said filter outputs and applying the combined outputs to means indicating a diagnosis of normal body condition where there is a substantial output from the first filter and no substantial output through the second filter, and a diagnosis of an abnormal body condition where the second filter has a substantial output.

3. The method of automatically sampling a heart sound to determine the presence or absence of a systolic murmur which comprises: applying a transducer to a patient's body to develop an electrical signal corresponding to the heart sound; passing said electrical signal through a filter passing electrical frequencies in the range of 20–30 c.p.s.; differentiating the output, if any, of said filter; and applying the differentiated output to means indicating an automatic diagnostic conclusion of the presence of a systolic murmur by the nature of said differentiated output.

4. The method of automatically sampling a heart sound to determine the presence or absence of a diastolic murmur which comprises: applying a transducer to a patient's body to develop an electrical signal corresponding to the heart sound; passing said electrical signal through a filter passing electrical frequencies in the range of 300–400 c.p.s.; integrating the output, if any, of said filter; and applying said integrated output to means indicating an automatic diagnostic conclusion of the presence of a diastolic murmur by the nature of said integrated output.

5. The method of automatically diagnosing the presence of a systolic gallop from heart sound which comprises: applying a transducer to a patient's body to develop an electrical signal corresponding to the heart sound; passing said electrical signal through a filter designed to pass a band of frequencies of from 65 to 80 c.p.s.; passing said filter output through a detector to determine the frequency of the envelope of the electrical signal; passing said envelope signal through a tuned filter; and applying the output of the tuned filter to means automatically indicating a diagnostic conclusion of the presence of systolic gallop from said tuned filter output.

6. The method of automatically diagnosing the presence of a pericardial rub from heat sound which comprises: applying a transducer to a patient's body to develop an electrical signal corresponding to heart sound; passing said electrical signal through first and second filters in parallel, said first filter passing frequencies of the order of 175 c.p.s., and the second filter passing frequencies of substantially 70 c.p.s.; delaying the output of said first filter in time until it is in phase with the output of said second filter; adding said delayed first and second outputs; and applying the result of the addition to means automatically indicating a diagnostic conclusion of the presence of a pericardial rub by the magnitude of said result.

7. The method of automatic diagnosis defined in claim 3, including the steps of applying electrical pickup means to the body and developing therefrom electrical voltages indicative respectively of the systole and diastole portions of the heart cycle; and applying the voltage indicative of the systole portion to said indicating means to give an automatic diagnosis of systolic murmur only when the differentiated output occurs in proper time phase with the voltage indicative of the systolic portion of the heart cycle.

8. The method of automatic diagnosis defined in claim 4, including the steps of applying electrical pickup means to the body and developing therefrom electrical voltages indicative respectively of the systole and diastole portions of the heart cycle; and applying the voltage indicative of the diastole portion to said indicating means to give an automatic diagnosis of diastolic murmur only when the integrated output occurs in proper time phase with the voltage indicative of the diastole portion of the heart cycle.

9. The method of automatic diagnosis defined in claim 5, including the steps of applying electrical pickup means to the body and developing therefrom electrical voltages indicative respectively of the systole and diastole portions of the heart cycle; and applying the voltage indicative of the systole portion to said indicating means to give an automatic diagnosis of systolic gallop only when the tuned filter output occurs in proper time phase with the voltage indicative of the systolic portion of the heart cycle.

10. Apparatus for automatically diagnosing the condition of the human heart from body sound which comprises: transducer means for picking up body sound and developing an electrical signal corresponding thereto; a filter circuit through which said signal is passed to produce a filter output signal of predetermined frequency which is characteristic but not conclusive of the existence of a certain heart condition; means for electrically operating on said filter output signal to produce a resultant signal which uniquely represents said certain heart condition; means for developing voltages indicative of the separate portions of the ventricular phase of the heart cycle; means for automatically giving a diagnostic indication of the existence of said certain heart condition; and means feeding both said resultant signal and a selected voltage to said indication means to give a diagnostic indication when a resultant signal occurs in the proper portion of the heart cycle as determined by said selected voltage.

11. Apparatus for analyzing and classifying heart sound to automatically diagnose a heart condition comprising: transducer means for picking up heart sound and developing an electrical signal conforming thereto; a plurality of parallel filter circuits passing frequencies of various values, which frequencies are characteristic but not conclusive of the existence of certain heart conditions; means for feeding said electrical signal through said filter circuits; means for operating on the outputs, if any, of said filter circuits to produce resultant signals which are uniquely indicative of the existence of said certain heart conditions; indicating means for each resultant signal for giving a diagnostic conclusion of the existence of the certain heart condition of which it is indicative; means for generating voltages corresponding to the systole and diastole portions of the heart cycle and to the time parts of said portions in which heart sounds occur; means for diagnostically indicating said time parts of said portions; and means for combining said voltages with the resultant signals for systolic and diastolic heart conditions in said indicating means so that the diagnostic conclusion of the existence of a condition is based also upon the proper relation of the resultant signal to the portion of the heart cycle.

12. Apparatus for effecting automatic diagnosis body condition comprising: means for developing an electrical signal in response to body sound; means for filtering said signal to pass a modified signal of a predetermined frequency characteristic but not conclusive of the presence of a certain body condition; means for operating on said modified signal to produce a resultant signal which uniquely represents said certain body condition; and means for automatically giving a diagnostic conclusion of the presence of said certain body condition from the presence of said resultant signal, said filtering means including substantially 75 c.p.s. filter circuit and said operating means including a substantially 150 c.p.s. filter circuit whose output modifies the output of the 75 c.p.s. filter circuit to give an automatic diagnostic conclusion of normal or abnormal heart condition.

13. Apparatus for effecting automatic diagnosis body condition comprising: means for developing an electrical signal in response to body sound; means for filtering said signal to pass a modified signal of a predetermined frequency characteristic but not conclusive of the presence of certain body condition; means for operating on said modified signal to produce a resultant signal which uniquely represents said certain body condition; and means for automatically giving a diagnostic conclusion of the presence of said certain body condition from the presence of said resultant signal, said filtering means passing frequencies between 20 c.p.s. and 30 c.p.s., said operating means including a differentiator for the output of the filtering means to give an automatic diagnostic conclusion of the presence of a systolic heart murmur.

14. Apparatus for effecting automatic diagnosis of body condition comprising: means for developing an electrical signal in response to body sound; means for filtering said signal to pass a modified signal of a predetermined frequency characteristic but not conclusive of the presence of a certain body condition; means for operating on said modified signal to produce a resultant signal which uniquely represents said certain body condition; and means for automatically giving a diagnostic conclusion of the presence of said certain body condition from the presence of said resultant signal, said filtering means passing frequencies in the band between 300 c.p.s. and 400 c.p.s., said operating means including an integrator for integrating the output of the filtering means to give an automatic diagnostic conclusion of the presence of a diastolic heart murmur.

15. Apparatus for effecting automatic diagnosis of body condition comprising: means for developing an electrical signal in response to body sound; means for filtering said signal to pass a modified signal of a predetermined frequency characteristic but not conclusive of the presence of a certain body condition; means for operating on said modified signal to produce a resultant signal which uniquely represents said certain body condition; and means for automatically giving a diagnostic conclusion of the presence of said certain body condition from the presence of said resultant signal, said filtering means passing frequencies between 65 c.p.s. and 80 c.p.s., said operating means comprising a detector for the envelope of the output of the filtering means and a tuned filter through which the envelope signal is passed to provide a resultant signal providing for an automatic diagnostic conclusion of systolic gallop of the heart.

16. Apparatus for effecting automatic diagnosis of body condition comprising: means for developing an electrical signal in response to body sound; means for filtering said signal to pass a modified signal of a predetermined frequency characteristic but not conclusive of the presence of a certain body condition; means for operating on said modified signal to produce a resultant signal which uniquely represents said certain body condition; and means for automatically giving a diagnostic conclusion of the presence of said certain body condition from the presence of said resultant signal, said filtering means comprising a first filter passing a frequency of substantially 175 c.p.s. and a second filter passing a frequency of substantially 70 c.p.s., said operating means including means for delaying the output of the first filter and means for adding the delayed output of the first filter and the output of the second filter to provide a resultant signal for automatic diagnosis of pericardial rub.

References Cited in the file of this patent

UNITED STATES PATENTS

| 1,686,504 | Dodge | Oct. 2, 1928 |
| 2,457,744 | Sturm | Dec. 28, 1948 |
| 2,468,648 | Abbott | Apr. 26, 1949 |
| 2,536,527 | Appel | Jan. 2, 1951 |
| 2,851,661 | Buland | Sept. 9, 1958 |

OTHER REFERENCES

Review of Scientific Instruments, vol. 25, No. 9, pages 899–901, September 1954.